(12) United States Patent
Mandal et al.

(10) Patent No.: US 10,409,309 B2
(45) Date of Patent: Sep. 10, 2019

(54) METHOD AND UNIT FOR LIMITING DEMAND OF POWER FOR A POWER CONSUMPTION SYSTEM

(71) Applicant: CARRIER CORPORATION, Jupiter, FL (US)

(72) Inventors: Subhasis Mandal, Bangalore (IN); Raviraj Kadiyala, Bangalore (IN)

(73) Assignee: CARRIER CORPORATION, Jupiter, FL (US)

( * ) Notice: Subject to any disclaimer, the term of this patent is extended or adjusted under 35 U.S.C. 154(b) by 423 days.

(21) Appl. No.: 15/065,094

(22) Filed: Mar. 9, 2016

(65) Prior Publication Data

US 2017/0212543 A1    Jul. 27, 2017

(30) Foreign Application Priority Data

Jan. 22, 2016   (IN) .............................. 201641002573

(51) Int. Cl.
*G05D 3/12* (2006.01)
*G05F 1/66* (2006.01)
*G05B 15/02* (2006.01)

(52) U.S. Cl.
CPC ............... *G05F 1/66* (2013.01); *G05B 15/02* (2013.01); *G05B 2219/2639* (2013.01); *G05B 2219/2642* (2013.01)

(58) Field of Classification Search
CPC .. G05F 1/66; G05B 15/02; G05B 2219/34306
USPC ....................................................... 700/219
See application file for complete search history.

(56) References Cited

U.S. PATENT DOCUMENTS

| 4,694,192 A | 9/1987 | Payne et al. |
|---|---|---|
| 8,525,692 B2 | 9/2013 | Mason, Jr. et al. |
| 8,983,673 B2 | 3/2015 | Chow |
| 2013/0151024 A1* | 6/2013 | Bae .......................... H02J 3/14 700/295 |
| 2014/0058572 A1 | 2/2014 | Stein et al. |

* cited by examiner

*Primary Examiner* — Tha-O H Bui
(74) *Attorney, Agent, or Firm* — Cantor Colburn LLP

(57) ABSTRACT

The present disclosure relates to a method and device for limiting demand of power for a power consumption system. The method comprises computing demand limiting threshold values based on one or more predefined parameters and further determining a demand limiting mode of the power consumption system to be one of enabled and disabled based on the demand limiting threshold values, the one or more predefined parameters and a ratio which is based on benefit to a user in terms of cost and impact on the user associated with the demand limiting mode. The method further comprises identifying demand limiting strategy based on the one or more predefined parameters and the impact when the demand limiting mode is enabled. Further the method comprises executing the demand limiting strategy on one or more target equipment based on a switching sequence.

15 Claims, 5 Drawing Sheets

METHOD AND UNIT FOR LIMITING DEMAND OF POWER FOR A POWER CONSUMPTION SYSTEM

FIELD OF THE DISCLOSURE

The present subject matter generally relates to power consumption systems. More particularly, but not exclusively, the present disclosure discloses a method and a device for limiting demand of power for a power consumption system.

BACKGROUND

A power consumption system may include a house region, industry region and so on which consumes power supplied by an electric power system. Consumption of the power by the power consumption system may be highest during peak hours as demand for power arises at such peak hours. Also, charges for power consumption during peak hours may be greater than charges of power consumption during non-peak hours. Demand charges could constitute up to 40% of electricity bills. Limiting the demand of power may reduce the demand charges and bring down cost of power.

One or more techniques are implemented for limiting the demand which includes consumers to use less power during peak hours. The techniques may include encouraging consumers to use less power during peak hours and moving the time of power consumption to non-peak hours such as night time and weekends. Also, one or more conventional systems are implemented for limiting demand of the power by controlling functioning and power consumption of loads associated with the power consumption systems.

One of the conventional systems discloses an electricity meter capable of limiting an electricity load. The electricity meter includes at least one load control and one or more predetermined time-of-use tiers. Each of the one or more predetermined time-of-use tiers has a corresponding time-of-use demand threshold. The method comprises determining a present time-of-use tier, determining a present time-of-use demand for the electricity load in the present time-of use tier and comparing the present time-of-use demand to the time-of-use demand threshold corresponding to the present time-of-use tier. Further, the method comprises setting the at least one load control to a de-energize mode when a de-energize condition is satisfied. The de-energize condition may include sub-conditions such as the present time-of-use demand exceeding the time-of-use demand threshold corresponding to the present time-of-use tier.

Another conventional system discloses a demand limit control system for maintaining power consumption of loads within a building below an upper demand limit. Here, the upper demand limit is separated from a lower demand limit by a deadband. Further, the demand limit control system provides a controller output signal when the power consumption is above the upper demand limit. Also, the system comprises a power demand controller for maintaining the power consumption. The demand limit control system maintains substantially constant power when power consumption is between the upper and lower demand limits and ramps down when the power consumption is below the lower demand limit. Further, each of a plurality of demand controlled loads are connected to the power demand controller and are responding to a different threshold value of the controller output signal. The plurality of demand controlled loads are conditioned to turn off when the controller output signal is above the threshold value and is conditioned to turn on when the controller output signal is below the threshold value.

Another conventional system discloses a method for managing an energy consuming load in a group of energy consuming loads and a method for managing the group of energy consuming loads. The method includes generating sets of load state data from the loads, making enablement state decisions for one or more loads using the sets of load state data, and implementing the enablement state decisions. An apparatus for managing an energy consuming load in a group of energy consuming loads, includes a transmitter, a receiver, a processor for processing sets of load state data to make an enablement state decision for the load, and a controller for implementing the enablement state decision. A method for managing an enablement state of an energy consuming load, comprises assigning an assigned duty cycle to the load, determining a load enabled utilization value for the load, and adjusting the assigned duty cycle using the load enabled utilization value.

The demand limiting techniques are a widely known method of reducing electricity cost but the existing techniques for demand limiting may face challenges in sectors like commercial buildings, retail buildings, hotels, restaurants and so on. Some of the existing systems may not include an aspect of real-time monitoring of the system based on which the demand limiting may either performed or avoided. Also, some of the existing systems may not include the aspect of adjusting one or parameters associated with the demand limiting depending on the monitoring. Also, the existing conventional systems may be ineffective because it may result in higher utility costs for consumers. This is primarily because of impact on consumer due to load curtailment activities involving HVAC, lighting and a combination of systems. The consumer satisfaction parameter typically outweighs potential cost benefits derived from demand limiting.

SUMMARY

Disclosed herein is a method for limiting demand of power for a power consumption system. The method comprises computing demand limiting threshold values based on one or more predefined parameters and further determining a demand limiting mode of the power consumption system to be one of enabled and disabled based on the demand limiting threshold values, the one or more predefined parameters and a ratio. The ratio is based on benefit to a user in terms of cost and impact on the user associated with the demand limiting mode. The demand limiting strategy is identified based on the one or more predefined parameters and the impact when the demand limiting mode is enabled. The identified demand limiting strategy is executed on one or more target equipment based on a switching sequence. Here, the switching sequence selects the one or more target equipment from one or more load groups associated with the power consumption system.

In another embodiment, the present disclosure relates to a demand limiting unit for limiting demand of power for a power consumption system. The demand limiting unit comprises a processor and a memory communicatively coupled to the processor. The memory stores processor-executable instructions which on execution cause the processor to compute demand limiting threshold values based on one or more predefined parameters. Upon computing, the processor determines a demand limiting mode of the power consumption system to be one of enabled and disabled based on the demand limiting threshold values, the one or more predefined parameters and a ratio. The ratio is based on benefit to a user in terms of cost and impact on the user associated with the demand limiting mode. Demand limiting strategy is identified by the processor based on the one or more predefined parameters and the impact when the demand limiting mode is enabled. The demand limiting strategy is executed by the processor on one or more target equipment based on a switching sequence. Here, the switching sequence selects the one or more target equipment from one or more load groups associated with the power consumption system, for limiting demand of power for the power consumption system.

In another embodiment, the present disclosure relates to a non-transitory computer readable medium including instructions stored thereon that when processed by at least one processor cause a device to perform operations which comprises computing demand limiting threshold values based on one or more predefined parameters. Upon computing, a demand limiting mode of the power consumption system to be one of enabled and disabled is determined based on the demand limiting threshold values, the one or more predefined parameters and a ratio and the ratio is based on benefit to a user in terms of cost and impact on the user associated with the demand limiting mode. A demand limiting strategy is identified based on the one or more predefined parameters and the impact when the demand limiting mode is enabled and the identified demand limiting strategy is executed on one or more target equipment based on a switching sequence. Here, the switching sequence selects the one or more target equipment from one or more load groups associated with the power consumption system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
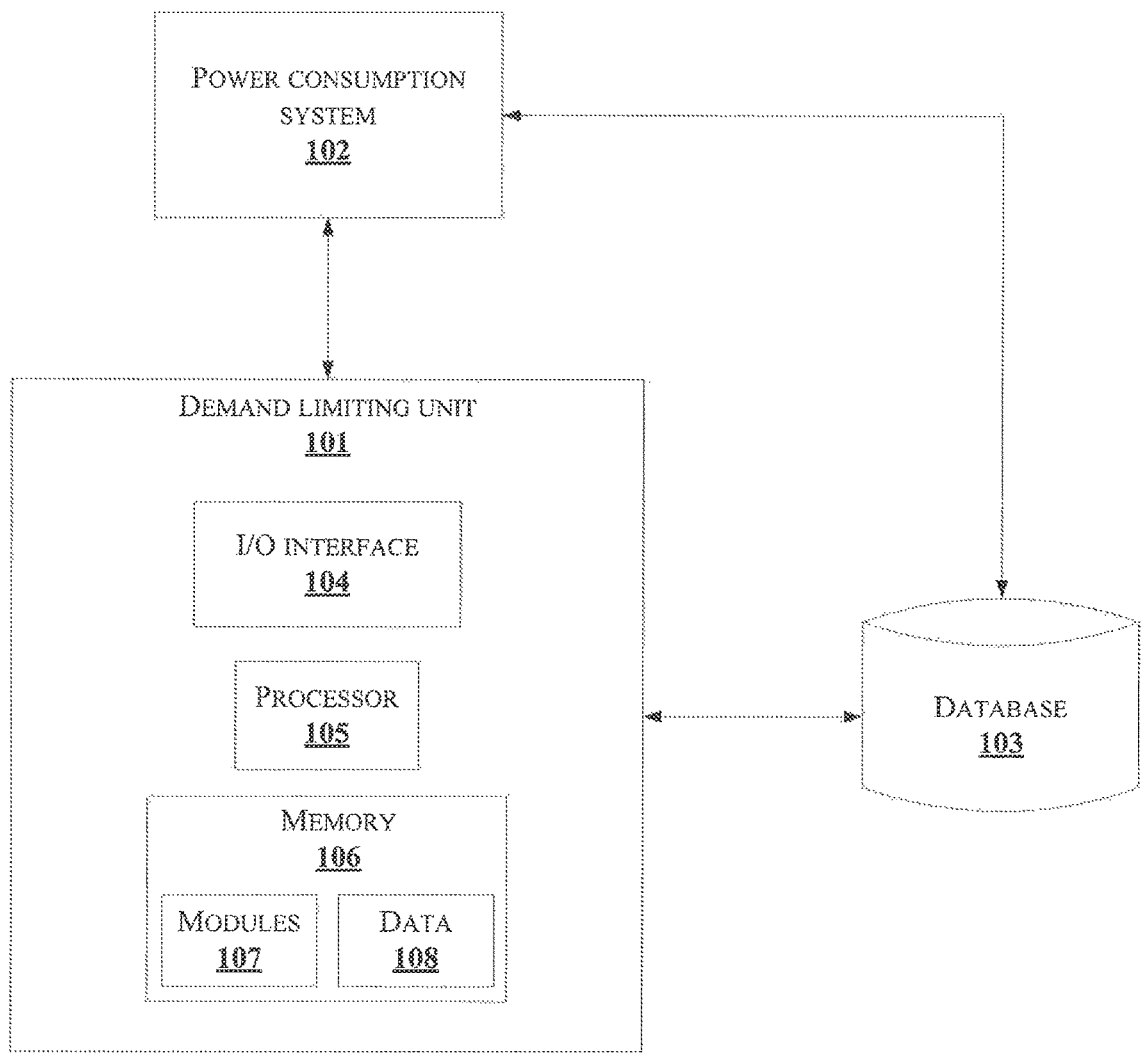
FIG. 1 illustrates an exemplary system for demand limiting of power for a power consumption system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to an efficient method for limiting demand of power for the power consumption system. The present disclosure considers impact on the user because of the demand limiting and the benefit of the user in terms of cost. The present also monitors the demand limiting performed, for adjusting the demand limiting until targeted demand limiting is achieved. The method disclosed in the present disclosure comprises computing demand limiting threshold values based on one or more predefined parameters and further determining a demand limiting mode of the power consumption system to be one of enabled and disabled based on the demand limiting threshold values, the one or more predefined parameters and a ratio. The ratio is based on benefit to a user in terms of cost and impact on the user associated with the demand limiting mode. When the demand limiting mode is enabled, a demand limiting strategy is identified based on the one or more predefined parameters and the impact when the demand limiting mode is enabled. The demand limiting strategy is executed on one or more target equipment based on a switching sequence.

FIG. 1 illustrates an exemplary system for demand limiting of power for a power consumption system in accordance with some embodiments of the present disclosure.

The exemplary system comprises of a demand limiting unit 101, a power consumption unit 102 and a database 103. The demand limiting unit 101 comprises an Input/Output (I/O) interface 104, a processor 105 and a memory 106. The memory 106 comprises one more modules 107 and data 108 and the memory 106 is coupled to the processor 103 for limiting demand of the power for the power consumption system 107. In one embodiment, the demand limiting unit 101 and the database 103 may be present in the power consumption system 107. In one implementation, the demand limiting unit 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

Initially, the demand limiting unit 101 computes demand limiting threshold values based on one or more predefined parameters and determines if a demand limiting mode for the power consumption system 107 to be one of enabled and disabled. The determination is based on the demand limiting threshold values, the one or more predefined parameters and a ratio. The predefined parameters may include, but are not limited to, temperature threshold values, humidity threshold values, time threshold values, lux threshold values, one or more conditions at a site comprising the one or more loads, profile data, power usage data, tariff data, billing data, demand-reduction target data, target data and demand limiting duration of the one or more loads. The ratio is based on benefit to a user in terms of cost and impact on the user associated with the demand limiting mode. Further, the demand limiting unit 101 identifies demand limiting strategy based on the one or more predefined parameters and the impact when the demand limiting mode is enabled. Identifying the demand limiting strategy comprises grouping the one or more loads to obtain one or more load groups and ranking the one or more loads groups for identifying the demand limiting strategy. Further, the demand limiting unit 101 executes the demand limiting strategy on one or more target equipment based on a switching sequence. Here, the switching sequence selects the one or more target equipment from one or more load groups associated with the power consumption system. The switching sequence is determined by prioritizing the one or more loads based on the one or more predefined parameters and the impact. In the system, further the demand limiting unit 101 monitors the power consumption system in one of the enabled and disabled demand limiting mode and also adjusts the one or more predefined parameters based on the monitoring which varies the impact accordingly.

The demand limiting unit 101 receives the data 106 such as the predefined parameters and other associated data for limiting demand of the power via the communication network (not shown in figure) through the I/O interface 104 of the demand limiting unit 101. The demand limiting unit 101 may receive the data from at least one of the power consumption system 102 and the database 103. Also, the demand limiting unit 101 provides output via the I/O interface 104. In one embodiment, the output may be provided to a display unit (not shown in Figure). Further, the I/O interface 104 is coupled with the processor 105 of the demand limiting unit 105.

In one embodiment, the data 106 may be received by the demand limiting unit 101 in form of data packets. In one embodiment, the communication network in the system is configured to be in listening mode and accept the data packets. In a non-limiting embodiment, the demand limiting unit 101 decodes the received data packets as one of General Packet Radio Service (GPRS) packets, Building Automation and Controls Network (BACnet) packets, Open Building Information Exchange (OBiX) files, File Transfer Protocol (FTP) files and others associated with the data packets.

The memory 106 in the demand limiting unit 101 is communicatively coupled to the processor 105. The memory 106 stores processor executable instructions which on execution help the demand limiting unit 101 to limit demand of the power for the power consumption system 102.

Figure 2:
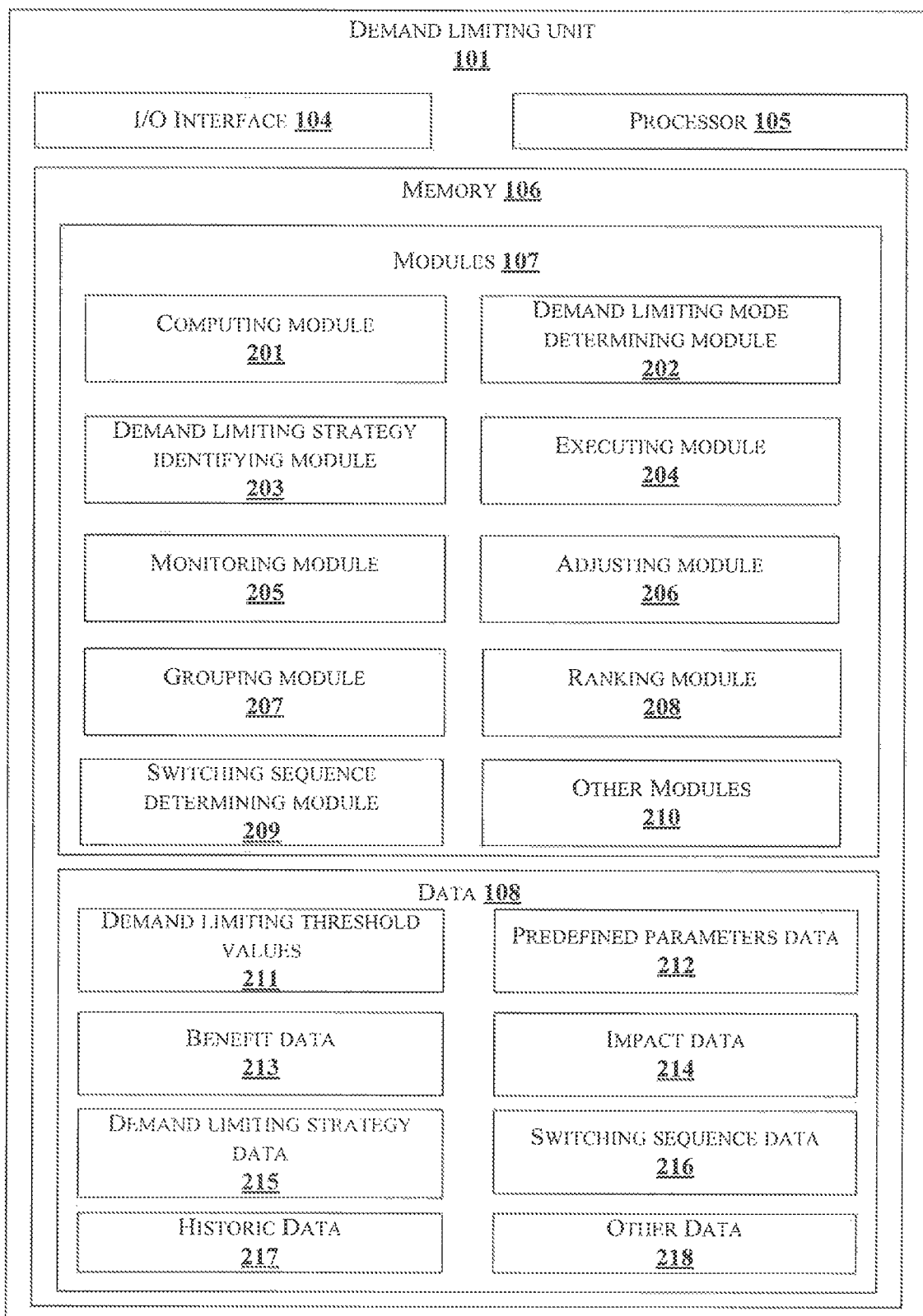
FIG. 2 illustrates a detailed block diagram of an exemplary demand limiting unit with various data and modules for limiting demand of power for a power consumption system in accordance with some embodiments of the present disclosure.

FIG. 2 illustrates a detailed block diagram of an exemplary demand limiting unit with various data and modules for limiting demand of power for a power consumption system in accordance with some embodiments of the present disclosure.

In the illustrated FIG. 2, the one or more data 108 and the one or more modules 107 stored in the memory 106 are described herein in detail.

In an embodiment, the one or more data 108 in the memory 106 are processed by the one or more modules 107 of the demand limiting unit 101. The one or more modules 107 may be stored within the memory 106 as shown in FIG. 2. In an example, the one or more modules 107, communicatively coupled to the processor 103, may also be present outside the memory 106 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 107 may include, for example, a computing module 201, a demand limiting mode determining module 202, a demand limiting strategy identifying module 203, an executing module 204, a monitoring module 205, an adjusting module 206, a grouping module 207, a ranking module 208, a switching sequence determining module 209 and other modules 210 associated with the demand limiting unit 101.

In one embodiment, the one or more data 108 may include, for example, demand limiting threshold values 211, predefined parameters 212, benefit data 213, impact data 214, demand limiting strategy data 215, switching sequence data 216, historic data 217 and other data 218 for limiting demand of the power. In one embodiment, at least one of the demand limiting threshold values 211, the predefined parameters 212, the benefit data 213, the impact data 214, the demand limiting strategy data 215, the switching sequence data 216 and the historic data 217 may be received by the demand limiting unit 101 in real-time for limiting demand of power.

Figure 3A:
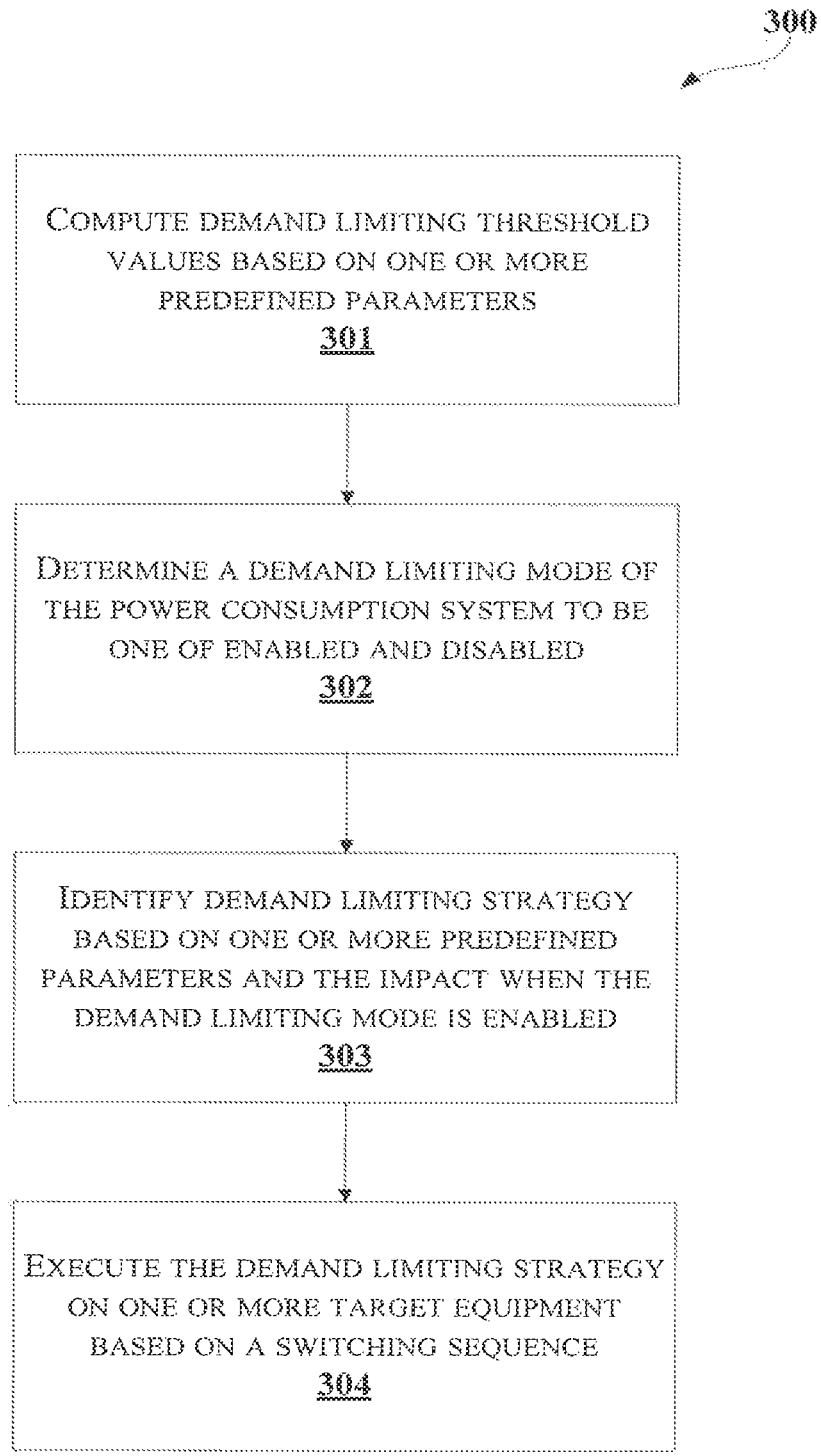
FIG. 3a shows a flowchart illustrating a method for limiting demand of power for a power consumption system in accordance with some embodiments of the present disclosure.
Figure 3B:
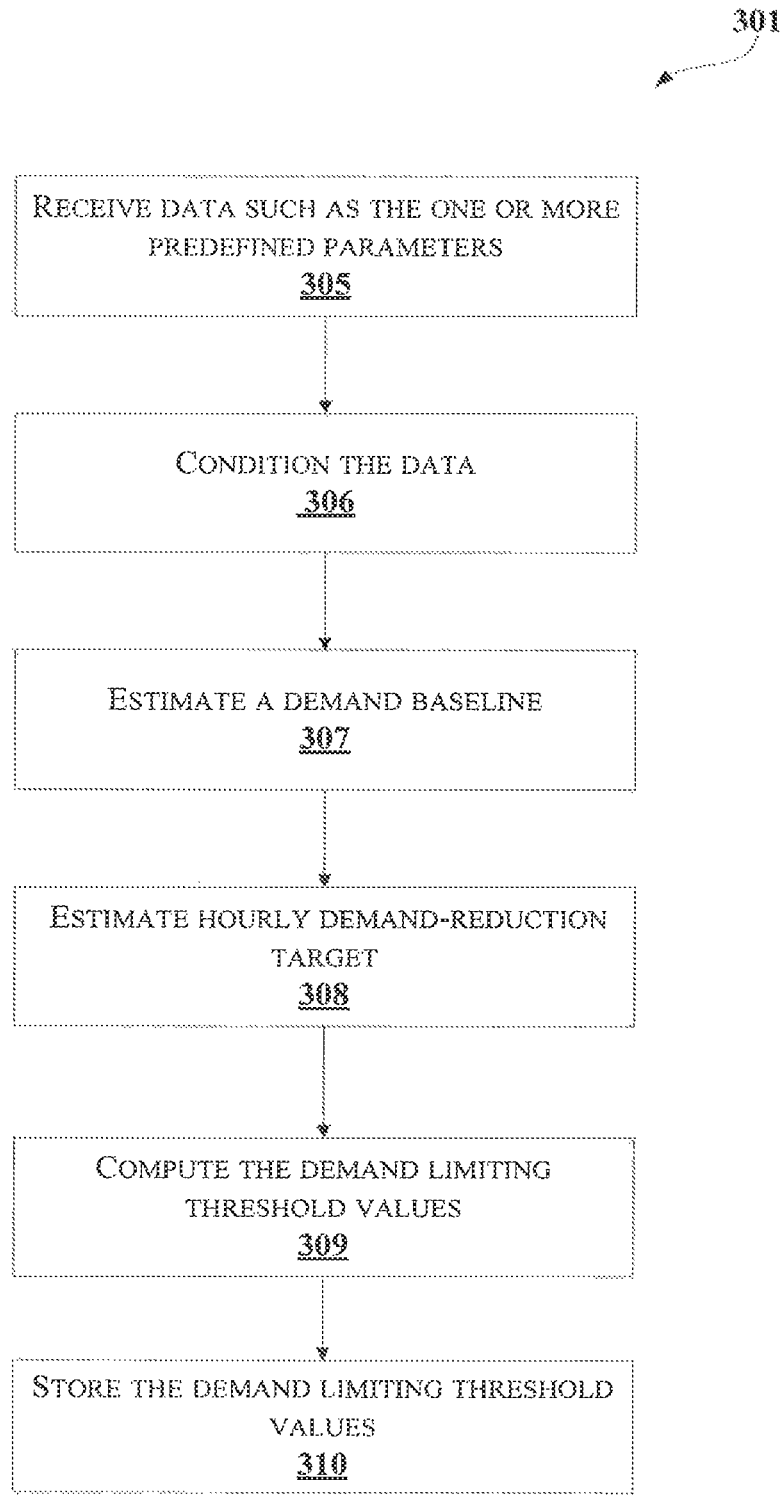
FIG. 3b shows a flowchart illustrating a method for computing demand limiting threshold values in accordance with some embodiments of the present disclosure.

FIG. 3b shows a flowchart illustrating a method for computing demand limiting threshold values in accordance with some embodiments of the present disclosure.

As illustrated in FIG. 3b, the method 301 comprises one or more blocks for computing the demand limiting threshold values 211. The method 301 may be described in the general context of computer executable instructions. Generally, computer executable instructions can include routines, programs, objects, components, data structures, procedures, modules, and functions, which perform particular functions or implement particular abstract data types.

The order in which the method 301 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The computing module 201 in the demand limiting unit 101 computes the demand limiting threshold values 211 based on the one or more predefined parameters 212. Computing of the demand limiting threshold values 211 comprises receiving data such as the one or more predefined parameters 212, conditioning the data, estimating a demand baseline, estimating hourly demand-reduction target, computing the demand limiting threshold values 211 and storing the demand limiting threshold values 211 as illustrated in FIG. 3b. In one embodiment, the demand limiting threshold values 211 may be 'ON' limiting demand threshold value and 'OFF' demand limiting threshold value based on which the demand limiting mode is determined to be one of enabled and disabled respectively.

At block 305, the one or more predefined parameters 212 may be received from at least one of the power consumption system 102 and the database 103. The one or more predefined parameters 212 may include, but are not limited to power usage data, tariff data, billing data, one or more conditions at a site comprising the one or more loads and threshold values associated to the one or more loads.

The power usage data includes kiloWatt (kW) readings of the power at predefined intervals of time. In one embodiment, the predefined interval of time may be every 1 minute, 5 minutes, 15 minutes, 30 minutes, 1 hour and so on. Table 1 illustrates exemplary readings of the power usage data.

TABLE 1

| Time Stamp | Value (kW) |
| --- | --- |
| 01Jan15 00:00:00 | 250.3 |
| 01Jan15 00:15:00 | 251.5 |
| 01Jan15 14:30:00 | 350.1 |
| 31Dec15 23:45:00 | 253.8 |

The tariff data provides details regarding computation of electricity charges during billing. For example, 1 kW of power is charged 15 dollars during peak hours where the peak hours may be 1200 hours to 1900 hours during the days of Monday to Friday excluding holidays in summer months of June-September 1 kW of power is charged 10 dollars during rest of the period which may be non-peak hours. Table 2 illustrates an exemplary embodiment of a tariff data.

TABLE 2

| Category | Period | Rate |
| --- | --- | --- |
| On Peak | June-September: 1200 hours to 1800 hours, Monday-Friday excluding holidays | 15 dollars per kW |
| Mid Peak | June-September: 0800 hours to1200 hours & 1800 hours to 2200 hours Monday-Friday excluding Holidays | 10 dollars per kW |
| Off Peak | Rest of the period | 8 dollars per kW |

The billing data includes, but is not limited to, name of vendor providing electricity, tariff plan, billing cycle period, recorded demand, billed demand and so on. Here, the billing cycle period is the period of consumption of power by a user for which a bill is generated. For example, the billing data of a user may be:

Vendor: XYZ Electric;
Tariff Plan: TOU;
Billing Period (Service Delivered): 10 Aug. 2015-9 Sep. 2015;
On-Peak Demand: 450 kW;
Mid-Peak Demand: 400 kW;
Off-Peak Demand: 350 kW;
Billed On-Peak Demand: 450 kW;
Billed Mid-Peak Demand: 400 kW; and
Billed Off-Peak Demand: 350 kW The one or more conditions at the site of the power consumption system 107 may include temperature, humidity, $CO_2$ levels, lighting levels, operating status of one or more loads associated with the site and mode of operation of the one or more loads. Consider an Air Conditioner (AC) as a load associated with the site, then the mode operations may be fan only mode, air conditioning mode, economizer mode and so on. An example of the one or more conditions of a load associated with the site may be:

Mode: Cooling;
Zone1 Temp: 73.1 Deg F;
Zone2 Temp: 74.5 Deg F;
Zone3 Temp: 73.9 Deg F;
RTU1 Status: ON, Compressor Status: OFF, Fan Status: ON;
RTU2 Status: ON, Compressor Status: ON, Fan Status: ON; and
RTU3 Status: ON, Compressor Status: ON, Fan Status: ON The threshold values associated to the one or more loads may include policies and guidelines to be adhered while limiting demand of the power. The threshold values, for example, may be a maximum temperature value of an AC, minimum duration up to which demand limiting conditions are acceptable and so on. An example of a policy associated with a load may be:

Cooling Mode: Max Temp. Limit=Normal+2 Deg F.
Heating Mode: Min Temp. Limit=Normal−2 Deg F.

Further, upon receiving the data for the computing, at the block 306, the data is conditioned in the demand limiting unit 101. The conditioning involves synchronization of meter data with bill data and further calibrating the data as required. The meter data is data read on meter associated with the one or more loads and the bill data is the data generated for the corresponding one or more loads in the billing cycle period. The conditioning also involves detection of improper bill data and estimating substitute values for relevant period.

After conditioning of the data, at block 307, the demand baseline is estimated by the demand limiting unit 101. The demand baseline is based on the tariff data and the billing cycle period. The historic data 217 associated with the one or more loads are also used for determining the demand baseline. Also, instead of obtaining baseline power threshold for every month which is based on the tariff data, the baseline power thresholds which are obtained for peak hours, mid-peak hours and non-peak hours are used for determining the demand baseline. Here, the peak hours are period in day where charges for the power is highest, the mid-peak hours are period in the day where the charges for the power is moderate and the non-peak hours are period in the day where the charges for the power is lowest. An example for the power usage data obtained for the peak hours, mid-peak hours and non-peak hours for any month of year may be:
   Baseline power threshold for peak hours: 450 kW
   Baseline power threshold for mid-peak hours: 400 kW
   Baseline power threshold for non-peak hours: 350 kW
In an embodiment, for obtaining the demand baseline, the baseline power threshold values are adjusted based on adjustment values which are obtained by monitoring the demand limiting unit. The demand baseline may be given as in equation 1.

$$\text{Demand baseline} = \text{baseline threshold value} +/- \text{adjustment value} \qquad 1$$

For example, assume the adjustment values to be +20 kW. The demand threshold values for the peak hours, the mid-peak hours and the non-peak is computed as:

Demand baseline(peak hours)=450 kW+20 kW=470 kW

Demand baseline(mid-peak hours)=400 kW+20 kW=420 kW

Demand baseline(Peak hours)=350 kW+20 kW=370 kW

In one embodiment, the baseline threshold values and the demand baseline are obtained for the billing cycle period of every month. For example, if the billing cycle period is from $10^{th}$ August to $9^{th}$ September, then the demand baseline obtained for $1^{st}$ to $9^{th}$ of August is different from the demand baseline obtained for $10^{th}$ to $31^{st}$ of August.

Further, at block 308, estimating of the hourly demand-reduction target comprises computing effective threshold, target percentage value, offset percentage value and differential percentage value. Here, the target percentage value is percentage reduction targeted against demand baseline. The offset percentage value is percentage value to account for response time during the demand limiting. The differential percentage value provides a differential value between the ON demand threshold value and the OFF demand threshold value to prevent frequent toggling of the demand limiting unit 101. Further, based the tariff data, the billing cycle period and the hourly demand-reduction target, the demand limiting threshold values 211 are computed.

The effective threshold is computed based on the demand baseline and ratchet values. In one embodiment, the ratchet values are used for determining the effective threshold instead of previous demand values from the historic data 217. The ratchet value may be highest power usage data recorded at the peak hours in previous summer. The ratchet values for the peak hours, mid-peak hours and the non-peak hours may be1:

Ratchet value(peak hour)=80%×460 kW=368 kW

Ratchet value(mid-peak hour)=80%×410 kW=328 kW

Ratchet value(non-peak hour)=80%×370 kW=296 kW

Here, 460 kW, 410 kW and 370 kW are the peak power usage data for previous summer.
The effective threshold is determined to be one of demand baseline and the ratchet value whichever is maximum and is given as in equation 2.

$$\text{Effective Threshold} = \text{Max}(\text{demand base}, \text{ratchet value}) \qquad 2$$

For example, Effective Threshold (peak hour)=Max (470, 368)=470 kW

Further, at block 309, the demand limiting threshold values 211 which comprise the ON demand limiting threshold value and the OFF demand limiting threshold value are computed. The ON demand limiting threshold value and the OFF demand limiting threshold value are given as in equations 3 and 4 respectively.

$$\begin{aligned}\text{ON demand limiting threshold value} = &\text{effective threshold} - ((\text{target percentage value} + \text{offset percentage value}) \times \text{effective threshold})\end{aligned} \qquad 3$$

$$\begin{aligned}\text{OFF demand limiting threshold value} = &\text{effective threshold} - ((\text{target percentage value} + \text{offset percentage value} + \text{differential percentage value}) \times \text{effective threshold})\end{aligned} \qquad 4$$

Based on the ON demand limiting threshold value and the OFF demand limiting threshold value, the demand limiting mode is determined to be one of enabled and disabled. Also, at block 310, the ON demand limiting threshold value and the OFF demand limiting threshold value are stored in the database 108 as the historic data 217.

The demand limiting mode determining module 202 determines the demand limiting mode to be one of enabled and disabled in the system based on the demand limiting threshold values 211. In one embodiment, the demand limiting threshold values 211 are computed at predefined times. In the system, when the demand exceeds the ON demand limiting threshold value, then the demand limiting mode is enabled and when the demand is exceeding the OFF demand limiting threshold value, then the demand limiting mode is disabled. The demand limiting mode to be one of enabled and disabled also depends on the one or more predefined parameters 212 and the ratio. The one or more predefined parameters 212 may include, but is not limited to temperature threshold values, humidity threshold values, lux threshold values and time threshold values. The ratio is based on the benefit data 213 and the impact data 214. The benefit data 213 is the benefit of the user in terms of cost and the impact data is the impact on the user associated with the demand limiting mode.

The temperature threshold values may be classified into Not To Exceed (NTE) temperature value and Not To Fall Below (NTFB) temperature value. When the temperature associated to the one or more loads exceeds the NTE temperature value, then one or more compliance flags are set to NO. When the temperature associated to the one or more loads is below the NTE temperature value but above the ideal temperature policy range, then one or more compliance flags are set to YES_ER(Yes Extended Range). When the temperature associated to the one or more loads does not exceed the upper limit of the ideal temperature policy range, then the one or more compliance flags are set to YES. For example, assume the NTE temperature value is set as 78 F and zone temperature reading of the site is one of greater than and equal to 78.1 F, then environment of the site is deemed to be not suitable and the compliance flag which may be CMP_TMP_HIGH for an AC related strategies is set to NO. When the zone temperature reading of the site is lesser than 78 F but greater than 76 F (upper limit of ideal policy range), then the compliance flag is set to YES_ER. And, when the zone temperature reading of the site is lesser than or equal to 76 F, then the compliance flag is set to YES. Similarly, when the temperature associated to the one or more loads is below than the NTFB temperature value, then the one or more compliance flags are set to NO. When the temperature associated to the one or more loads is above the NTFB temperature value but below the ideal temperature policy range, then one or more compliance flags are set to YES_ER. When the temperature associated to the one or more loads is not below the lower limit of the ideal temperature policy range, then the one or more compliance flags are set to YES. For example, assume the NTFB temperature value is set as 68 F and zone temperature reading of the site is one of lesser than and equal to 67.9 F, then environment of the site is deemed to be not suitable and the compliance flag which may be CMP_TMP_LOW for heating related strategies is set to NO. When the zone temperature reading of the site is greater than 68 F but lesser than 70 F (lower limit of ideal policy range), then compliance flag is set to YES_ER. When the zone temperature reading of the site is greater than or equal to 70 F, then the compliance flag is set to YES.

The humidity threshold values may be classified into NTE humidity value and NTFB humidity value. When the humidity associated to the one or more loads exceeds the NTE humidity value, then one or more compliance flags are set to NO. When the humidity associated to the one or more loads is below the NTE humidity value but above the ideal humidity policy range, then one or more compliance flags are set to YES_ER. When the humidity associated to the one or more loads does not exceed the upper limit of the ideal humidity policy range, then one or more compliance flags are set to YES. For example, assume the NTE humidity value is set as 80% and zone humidity reading of the site is one of greater than and equal to 80.1%, then the compliance flag which may be CMP_RH_HIGH for humidity control strategies is set to NO. When the zone humidity reading of the site is lesser than 80% but greater than 70% (upper limit of ideal policy range), then the compliance flag is set to YES_ER. And, when the zone humidity reading of the site is lesser than or equal to 70%, then the compliance flag is set to YES. Similarly, when the humidity associated to the one or more loads is below than the NTFB humidity value, then one or more compliance flags are set to NO. When the humidity associated to the one or more loads is above the NTFB humidity value but below the ideal humidity policy range, then one or more compliance flags are set to YES_ER. When the humidity associated to the one or more loads is not below the lower limit of the ideal humidity policy range, then one or more compliance flags are set to YES. For example, assume the NTFB humidity value is set as 20% and zone humidity reading of the site is one of lesser than and equal to 19.9%, then the compliance flag which may be CMP_RH_LOW for humidity control strategies is set to NO. When the zone humidity reading of the site is greater than 20% but lesser than 30% (lower limit of ideal policy range), then the compliance flag is set to YES_ER. When the zone humidity reading of the site is greater than or equal to 30%, then the compliance flag is set to YES.

The lux threshold value may be a NTFB lux value where when the lux associated to the one or more loads is below than the NTFB lux value, then one or more compliance flags are set to NO. When the lux associated to the one or more loads is above the NTFB lux value but below the ideal lux policy range, then one or more compliance flags are set to YES_ER. When the lux associated to the one or more loads is not below the lower limit of the ideal lux policy range, then one or more compliance flags are set to YES. For example, assume the NTFB lux value is set as 600 lux and zone lux reading of the site is one of lesser than and equal to 599 lux, then the compliance flag which may be CMP_LUX for lighting control strategies is set to NO. When the zone lux reading of the site is greater than 600 but lesser than 700 (lower limit of ideal policy range), then the compliance flag is set to YES_ER. When the zone lux reading of the site is greater than or equal to 700, then the compliance flag is set to YES.

The Extended Range Hours provide duration of time in the system for which the above mentioned compliance parameters are set as YES_ER. The associated threshold value may be NTE time value which may be set for one of a day, a month and a year. When the duration of time exceeds the NTE time value, then one or more load group's demand limit compliance mode flags are set to NO. When the duration of time does not exceed the NTE time value, then one or more load group's demand limit compliance mode flags are set to YES. For example, assume the NTE time value is set as 2 hours per day and when duration of time is greater than 2 hours, the demand limit compliance mode flag which may be CMP_DL__HVAC_GRP_3 for HVAC load group 3 is set to NO. When the duration of time is less than 2 hours, then the demand limit compliance mode flag is set to YES.

Further, when the compliance flag relating to the time threshold values is set to NO, the ratio is computed in the system. The ratio is based on the benefit data 213 which is the benefit of the user terms of cost and the impact data 214 which is the impact on the user when the demand limiting mode is enabled. The ratio also depends upon the billing cycle period. In one exemplary embodiment, the ratio may be given as in equation 5.

$$\text{Ratio} = \frac{\text{Min(targeted demand charge reduction, achieved demand charge reduction)}}{\text{Extended Range Hours} * \text{impact weightage per hour}} \qquad 5$$

When the ratio is lesser than a predetermined ratio value, then the adjusting module 206 computes a new target percentage for which the ratio is greater than the predetermined ratio. The impact weightage is computed as a function of time from start of the billing cycle period to end of the billing cycle period for providing lower impact weightage with time in order to enable the demand limiting mode. In one embodiment, the impact weightage is also based on the extended range hours recorded for duration of month.

When the demand limiting mode is enabled in the system, the demand limiting strategy identifying module 203 identifies the demand limiting strategy data 215 which comprises the demand limiting strategy, based on one or more predefined parameters 212 and the impact data 214 associated with the demand limiting mode in the system. Identifying the demand limiting strategy data 215 comprises grouping the one or more loads to obtain one or more load groups by the grouping module 207 and ranking the one or more load groups by the ranking module 208. Further the identification performed by the demand limiting strategy identifying module 203 comprises selecting demand load groups from the one or more load groups and identifying the demand limiting strategy data 215 for the demand load groups. The one or more predefined parameters 212 may include, but are not limited to, target data, demand limiting duration, the time threshold values, one or more conditions at the site comprising the one or more loads, target data and demand limiting of the one or more loads.

In one embodiment, grouping of the one or more loads performed by the grouping module 207 is based on the target data. Here, the one or more loads with approximately same demand that is exceeding the threshold values are grouped to obtain the one or more load groups. For example, if demand breach is lesser than 5 kW to 10 kW, small non-critical area loads are grouped to obtain one or more load groups and if the demand breach is 30 kW to 50 kW, major loads like cooling system are grouped to obtain the one or more load groups. In one embodiment, based on the time threshold values, the one or more load groups are obtained and also depending on the one or more conditions at the site comprising the one or more loads. The one more conditions may include, but are not limited to at least one of cooling, heating, lighting, asset condition data, over-ride data and so on. For example, consider a site experiencing an air conditioning equipment downtime and high temperature, the demand limiting unit is configured to select strategies other than that of air conditioning strategies. In one embodiment, each of the loads groups may comprise one or more loads. The one or more load groups are obtained such that the one or more load groups are optimal for the site in the system.

Ranking of the one or more load groups performed by the ranking module 208 comprises assigning priorities to the one or more load groups in terms of the impact on the user 214. For example, the one or more loads serving non-critical areas like common areas, Non customer areas, Subset of Lighting feeders in areas covered by multiple feeders, Subset of HVAC units for areas covered by multiple units etc. are assigned high priority.

Further, the demand limiting load groups are selected based on the one or more load groups having similar impact on the user 214 and the demand limiting load groups are further prioritized based on matching one or more load groups whose operating status enables to obtain targeted demand limiting. In one embodiment, the one or more loads which have issues such as communicating issues and sensor issues are not considered for calculating operational capacity of the one or more load groups.

The demand limiting strategy identifying module 203 identifies demand limiting strategy data 215 for the demand limiting load groups. The demand limiting strategy data 215 may be associated with the functioning of the one or more loads which include, but is not limited to, temperature set point adjustment of AC and heaters, fan only mode operation, off mode, dimming of lights and so on. The demand limiting strategy data 215 is selected to reduce demand which is recorded in the one or more loads. In one embodiment, the demand limiting strategy data 215 may be selected based on time in one of day, week, month and year. For example, during mid-day of summer, there is sufficient ambient lighting therefore when demand arises; dimming of lights is selected as the demand limiting strategy data 215.

Upon identifying the demand limiting strategy data 215, the executing module 204 executes the demand limiting strategy on one or more target equipment based on a switching sequence data 216. Here, the switching sequence data 216 comprises the switching sequence and the switching sequence selects one or more target equipment from the one or more loads based on the one or more predefined parameters 212 and the impact data 214 associated with the demand limiting mode. For selecting the switching sequence data 216 in the demand limiting unit 101 by the switching sequence determining module 209, initially load switching conditions are determined for the demand limiting load groups. In one embodiment, the demand limit unit 101 checks if the demand limiting load groups are controllable for performing the demand limiting on the demand limiting load groups. For example, if any of the demand limiting load group is one of not communicating and/or sensors associated with the demand limiting load group is not working, then this demand limiting load group is excluded from the switching sequence 216. Further, the demand limiting load groups are prioritized based on the impact data 214 and also based on functioning of the demand limiting load group during the demand limiting. For example, the demand limiting load groups with highest priority in a cooling equipment load groups are ineffective AC units, effective AC units whose zone temperature is low and effective AC units whose zone temperature is high. In one embodiment, the demand limiting load groups are selected for minimum requirement in the switching sequence 216. The switching sequence data 216 relates to switching time for each of the target equipment in the demand limiting load groups. In one embodiment, the switching time is based on the historic data 217 and performance of the demand limiting unit 101. The switching sequence data 216 is selected to distribute time across each of the one or more target equipment, and to minimize the impact 214. For example, AC units serving a common area would be grouped into sets of one of 2, 3 and 4 in number.

The executing module 204 executes the demand limiting strategy based on the selected switching sequence data 216. The demand limiting strategy may be executed on the one or more target equipment for the switching time which may be 30 minutes. The switching time is based on maximum time that policy requirements can be complied to in demand limiting mode for the load group associated with the target equipment. Further, the demand limiting strategy is executed on the next target equipment for a switching time and disabled in the previous target equipment.

The monitoring module 205 in the demand limiting unit 101 monitors the system which comprises monitoring one or more predefined parameters 212, the impact data 214 and the benefit data 213. In one embodiment, the monitoring of the system is performed in real-time at predefined intervals of time. The impact data which provides the impact on the user when the demand limiting is performed is computed based on the monitoring and the benefit data 213.

Further, the data is continuously monitored by the monitoring module 205 through one of reading and computing sliding window average of the demand over a period lesser than utility interval associated with the one or more loads. The sliding window average is defined as average of the power usage data over preceding period whose length is defined by window size. For example, consider a sliding window of 15 minutes, the data read at 3 pm, is the average of data from 2:45 pm to 3:00 pm. And the data read at 3:01 pm is the average of data from 2:46 pm to 3:01 pm. In one embodiment, length of the sliding window is configurable. The utility interval is period at which the demand is monitored and the user is charged for the demand.

Further, during the monitoring, when the demand is lesser than the OFF demand limiting threshold value or one or more compliance flags are set as NO, then one or more loads are restored to normal operation. In one embodiment, a restoration module (not shown in figure) is used for restoring functionality of the one or more loads. In one embodiment, the restoration is performed such that the system is not affected by the restoration. In one embodiment, the restoration is performed such that only the affected load group is restored and other load groups continue in demand limit mode. For example, if dimming of lights is executed and lux level drops below 600 lux, the compliance flag will be CMP_LUX to NO by the adjusting module 206. On this change of value, lights are restored to normal operation. However, any air conditioning demand limiting strategies continue to be operational.

The adjusting module 206 in the demand limiting unit 101 adjusts the one or more predefined parameters 212 based on the monitoring. Initially for the adjusting, the impact data 214 is obtained by the demand limiting unit 101. Further, based on the performance of the demand limiting unit 101, new target percentage values obtained. Further, based on the one or more demand limiting loads, variation in threshold values and demand reduction for different demand limiting strategies 215 during the billing cycle period the months, the one or more load groups that provide best results in reducing demand with minimum impact are identified. Further, output from the adjusting module is used as feedback for further demand limiting in the system. Also based on variation of functioning of the one or more loads during one or more conditions at the site, the target values are also tuned based on availability and condition of the one or more loads available at that point of time.

The other modules 210 may refer to such modules which can be referred for limiting demand of the power for the power consumption system 102.

The other data 218 may refer to such data which can be referred for limiting demand of the power for the power consumption system 102.

FIG. 3 shows a flowchart illustrating a method for limiting demand of power for a power consumption system in accordance with some embodiments of the present disclosure; and As illustrated in FIG. 3, the method 300 comprises one or more blocks for limiting demand of the power for the power consumption system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the computing unit 201 in the demand limiting unit 101 computes the demand limiting threshold values 211 based on the one or more predefined parameters 212. The predefined parameters 212 may include the temperature threshold values, the humidity threshold values, the time threshold values, the lux threshold values, at least one of cooling, heating, lighting availabilities and over rides at the site comprising the one or more loads, the profile data, the power usage data, the tariff data, the billing data, the demand-reduction target data, target data and demand limiting of the one or more loads.

At block 302, the demand limiting mode determining module 202 in the demand limiting unit 101 determines if the demand limiting mode to be one of enabled and disabled.

At block 303, the demand limiting strategy identifying module 203 in the demand limiting unit 101 identifies the demand limiting strategy data 215 based on the one or more predefined parameters 212 and the impact data 214 when the demand limiting mode is enabled.

At block 304, the executing module 204 in the demand limiting unit 101 executes the demand limiting strategy on the one or more target equipment based on the switching sequence data 216.

Computer System

Figure 4:
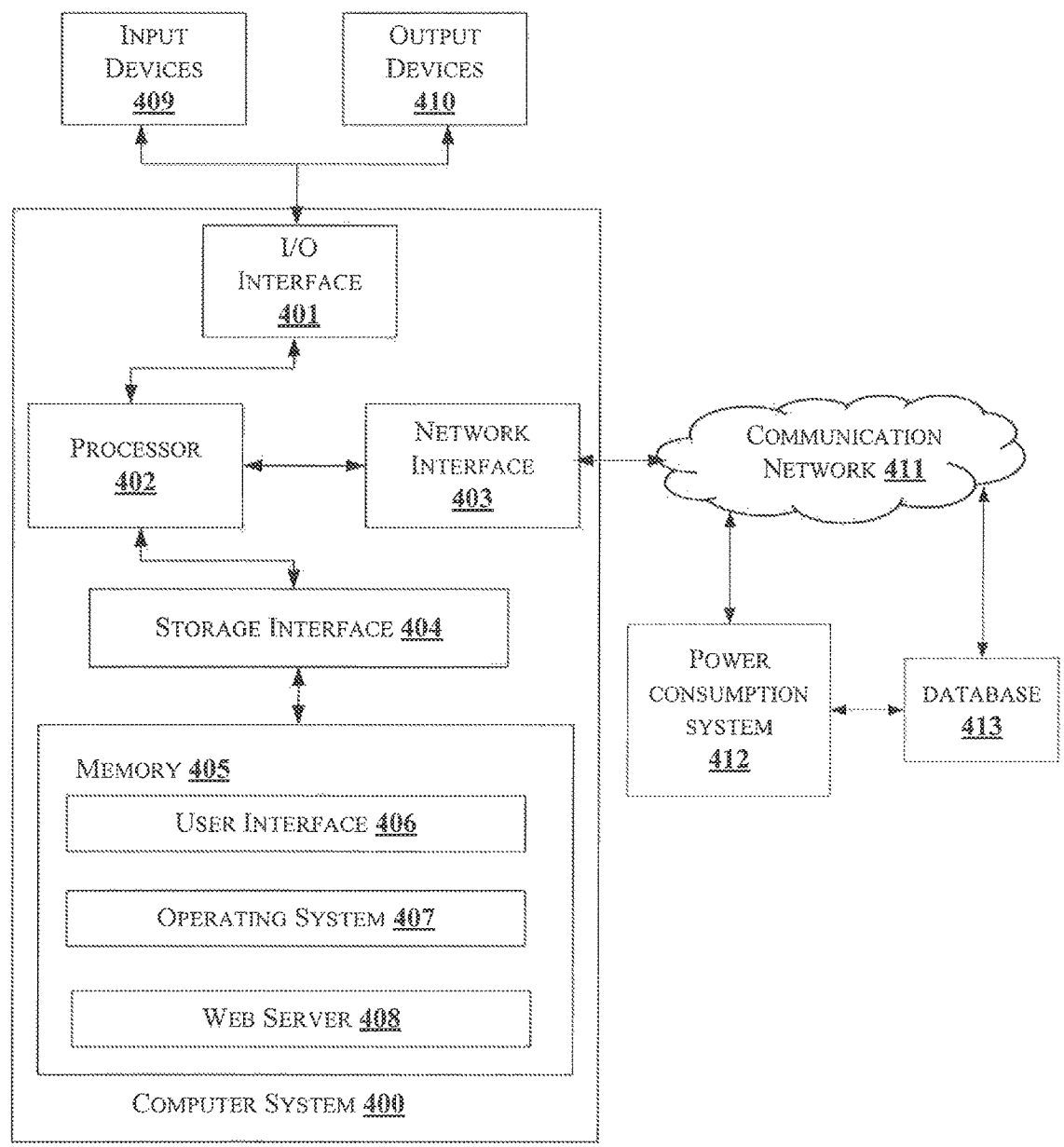
FIG. 4 is a block diagram of an exemplary computer system for implementing some embodiments consistent with the present disclosure.

FIG. 4 is a block diagram of an exemplary computer system for implementing some embodiments consistent with the present disclosure.

In an embodiment, the computer system 400 is used to implement the demand limiting unit 101. The computer system 400 may comprise a central processing unit ("CPU" or "processor") 402. The processor 402 may comprise at least one data processor for executing program components for managing the performance of at least one instrumentation device deployed across one or more sites. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device 403 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 410 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 is connected to the power consumption system 412 and the database 413 through a communication network 411. In one embodiment, the computer system 400 and the database 413 may be in the power consumption system 412. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 411, the computer system 400 may communicate with the one or more power consumption system 412 and databases 413. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to the memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web server 408 etc. In some embodiments, computer system 400 may store user/application data (not shown in figure), such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Embodiments of the present disclosure disclose a method for demand limiting of power for a power consumption system based on benefits of a user in terms of cost and the impact on the user.

Embodiments of the present disclosure provide a demand limiting unit which provisions lesser bill amount and better user experience.

Embodiments of the present disclosure provide a demand limiting unit which minimizes the duration of demand limiting efficiently.

Embodiments of the present disclosure provide a demand limiting unit which ensures demand limiting without compromising the user needs.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Demand Limiting Unit |
| 102 | I/O Interface |
| 103 | Processor |
| 104 | Memory |
| 105 | Modules |
| 106 | Data |
| 107 | Power Consumption |
| 108 | Database |
| 201 | Computing Module |
| 202 | Demand Limiting Mode Determination Module |
| 203 | Demand Limiting Strategy Identifying Module |
| 204 | Executing Module |
| 205 | Monitoring Module |
| 206 | Adjusting Module |
| 207 | Grouping Module |
| 208 | Ranking Module |
| 209 | Switching Sequence Determining Module |
| 210 | Other Modules |
| 211 | Demand Limiting Threshold Values |
| 212 | Predefined Parameters |
| 213 | Benefit Data |
| 214 | Impact Data |
| 215 | Demand Limiting Strategy Data |
| 216 | Switching Strategy Data |
| 217 | Historic data |
| 218 | Other Data |
| 400 | Computer System |
| 401 | I/O Interface |
| 402 | Processor |
| 403 | Network Interface |
| 404 | Storage Interface |
| 405 | Memory |
| 406 | User Interface |
| 407 | Operating System |
| 408 | Web Server |
| 409 | Input Devices |
| 410 | Output Devices |
| 411 | Communication Network |
| 412 | Power Consumption System |
| 413 | Database |

We claim:

1. A method for limiting demand of power for a power consumption system, comprising:

computing, by a demand limiting unit, demand limiting threshold values based on one or more predefined parameters;

determining, by the demand limiting unit, a demand limiting mode of the power consumption system to be one of an enabled demand limiting mode and a disabled demand limiting mode, based on the demand limiting threshold values, the one or more predefined parameters and a ratio, wherein the ratio is based on benefit to a user in terms of cost and impact on the user associated with the demand limiting mode;

identifying, by the demand limiting unit, demand limiting strategy based on the one or more predefined parameters and the impact, when in the enabled demand limiting mode; and executing, by the demand limiting unit, the demand limiting strategy on one or more target equipment based on a switching sequence, wherein the switching sequence selects the one or more target equipment from one or more load groups associated with the power consumption system, for limiting demand of power for the power consumption system.

2. The method as claimed in claim 1 further comprising:
monitoring, by the demand limiting unit, the power consumption system in one of the enabled demand limiting mode and disabled demand limiting mode; and
adjusting, by the demand limiting unit, the one or more predefined parameters based on the monitoring, wherein the adjusting varies the impact.

3. The method as claimed in claim 1, wherein the one or more predefined parameters comprise temperature threshold values, humidity threshold values, time threshold values, lux threshold values, one or more conditions at a site comprising the one or more loads, profile data, power usage data, tariff data, billing data, demand reduction target data, target data and demand limiting of the one or more loads.

4. The method as claimed in claim 1, wherein identifying the demand limiting strategy further comprising:
grouping, by the demand limiting unit, the one or more loads to obtain one or more load groups; and
ranking, by the demand limiting unit, the one or more loads groups for identifying the demand limiting strategy.

5. The method as claimed in claim 1, wherein the switching sequence is determined by prioritizing the one or more loads based on the one or more predefined parameters and the impact.

6. A demand limiting unit for limiting demand of power for a power consumption system, comprises:
a processor; and
a memory communicatively coupled to the processor, wherein the memory stores processor-executable instructions, which, on execution, cause the processor to:
compute demand limiting threshold values based on one or more predefined parameters;
determine a demand limiting mode of the power consumption system to be one of an enabled demand limiting mode and a disabled demand limiting mode, based on the demand limiting threshold values, the one or more predefined parameters and a ratio, wherein the ratio is based on benefit to a user in terms of cost and impact on the user associated with the demand limiting mode;
identify demand limiting strategy based on the one or more predefined parameters and the impact, when in the enabled demand limiting mode; and
execute the demand limiting strategy on one or more target equipment based on a switching sequence, wherein the switching sequence selects the one or more target equipment from one or more load groups associated with the power consumption system, for limiting demand of power for the power consumption system.

7. The demand limiting unit as claimed in claim 6 further comprises:
monitoring the power consumption system in one of the enabled demand limiting mode and disabled demand limiting mode; and
adjusting the one or more predefined parameters based on the monitoring, wherein the adjusting varies the impact.

8. The demand limiting unit as claimed in claim 6, wherein the one or more predefined parameters comprise temperature threshold values, humidity threshold values, time threshold values, lux threshold values, one or more conditions at a site comprising the one or more loads, profile data, power usage data, tariff data, billing data, demand-reduction target data, target data and demand limiting of the one or more loads.

9. The demand limiting unit as claimed in claim 6, wherein identifying the demand limiting strategy further comprises:
grouping the one or more loads to obtain one or more load groups; and
ranking the one or more loads groups for identifying the demand limiting strategy.

10. The demand limiting unit as claimed in claim 6, wherein the switching sequence is determined by prioritizing the one or more loads based on the one or more predefined parameters and the impact.

11. A non-transitory computer readable medium including instructions stored thereon that when processed by at least one processor cause a device to perform operations comprising:
computing demand limiting threshold values based on one or more predefined parameters;
determining a demand limiting mode of the power consumption system to be one of an enabled demand limiting mode and a disabled demand limiting mode, based on the demand limiting threshold values, the one or more predefined parameters and a ratio, wherein the ratio is based on benefit to a user in terms of cost and impact on the user associated with the demand limiting mode;
identifying demand limiting strategy based on the one or more predefined parameters and the impact ,when in the enabled demand limiting mode; and
executing the demand limiting strategy on one or more target equipment based on a switching sequence, wherein the switching sequence selects the one or more target equipment from one or more load groups associated with the power consumption system, for limiting demand of power for the power consumption system.

12. The non-transitory computer readable medium as claimed in claim 11 further comprises:
monitoring the power consumption system in one of the enabled demand limiting mode and disabled demand limiting mode; and
adjusting the one or more predefined parameters based on the monitoring, wherein the adjusting varies the impact.

13. The non-transitory computer readable medium as claimed in claim 11, wherein the one or more predefined parameters comprise temperature threshold values, humidity threshold values, time threshold values, lux threshold values, one or more conditions at a site comprising the one or more loads, profile data, power usage data, tariff data, billing data, demand- reduction target data, target data and demand limiting duration of the one or more loads.

14. The non-transitory computer readable medium as claimed in claim 11, wherein identifying the demand limiting strategy further comprises:
grouping the one or more loads to obtain one or more load groups; and
ranking the one or more loads groups for identifying the demand limiting strategy.

15. The non-transitory computer readable medium as claimed in claim 11, wherein the switching sequence is determined by prioritizing the one or more loads based on the one or more predefined parameters and the impact.

* * * * *